United States Patent
Zhang et al.

(10) Patent No.: US 9,630,507 B2
(45) Date of Patent: Apr. 25, 2017

(54) BOGIE FOR RAIL VEHICLE

(71) Applicant: TANGSHAN RAILWAY VEHICLE CO., LTD., Tangshan (CN)

(72) Inventors: Lixin Zhang, Tangshan (CN); Yanhong Chen, Tangshan (CN); Xiaojun Zhang, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 155 days.

(21) Appl. No.: 14/553,993

(22) Filed: Nov. 25, 2014

(65) Prior Publication Data

US 2015/0090553 A1  Apr. 2, 2015

Related U.S. Application Data

(63) Continuation of application No. PCT/CN2013/089071, filed on Dec. 11, 2013.

(30) Foreign Application Priority Data

Dec. 18, 2012 (CN) .......................... 2012 1 0554659

(51) Int. Cl.
  *B60L 5/39* (2006.01)
  *B61F 5/26* (2006.01)
  *B61F 5/52* (2006.01)

(52) U.S. Cl.
  CPC ........ *B60L 5/39* (2013.01); *B61F 5/26* (2013.01); *B61F 5/52* (2013.01); *B60L 2200/26* (2013.01)

(58) Field of Classification Search
  CPC .......... B60L 5/39; B60L 2200/26; B60L 5/38; B60L 13/035; B61F 5/26; B61F 5/52
  (Continued)

(56) References Cited

U.S. PATENT DOCUMENTS 726,600 A * 4/1903 Wheeler ................. A63H 19/10
  191/46
1,517,105 A * 11/1924 Dehler ...................... B61F 5/52
  105/206.1

(Continued)

FOREIGN PATENT DOCUMENTS

CN  201439309 U  4/2010
CN  201457400 U  5/2010

(Continued)

OTHER PUBLICATIONS

International Search Report of corresponding International PCT Application No. PCT/CN2013/089071, dated Feb. 6, 2014.

(Continued)

*Primary Examiner* — Mark Le
(74) *Attorney, Agent, or Firm* — J. C. Patents

(57) ABSTRACT

A bogie for a rail vehicle includes: two pairs of wheel sets arranged frontward and backward (51), axle boxes (52) respectively fixedly arranged at both ends of a central rotating shaft of the wheel set, and a frame arranged on two axle boxes on the same side (50), and further includes: a current collector mounting plate (53) that is fixedly mounted with a current collector, with both ends of the current collector mounting plate being respectively fixedly connected to the two axle boxes on the same side. In the bogie for the rail vehicle, the current collector is fixedly connected on the axle box, and thus has the same state of motion as the axle box, effectively reducing the displacements of the current collector in all directions relative to the third rail during operation, and reducing vibration and impact suffered by the current collector.

10 Claims, 7 Drawing Sheets

(58) Field of Classification Search
USPC .......................................................... 191/49
See application file for complete search history.

(56) References Cited

U.S. PATENT DOCUMENTS

| | | | | |
|---|---|---|---|---|
| 3,740,498 A | * | 6/1973 | Herbert | B60L 5/38 |
| | | | | 191/49 |
| 6,079,335 A | | 6/2000 | Polley | 105/218.2 |
| D445,019 S | * | 7/2001 | Vitetta | D8/349 |

FOREIGN PATENT DOCUMENTS

| | | |
|---|---|---|
| CN | 102114851 A | 7/2011 |
| CN | 201951479 U | 8/2011 |
| CN | 101857033 B | 3/2012 |
| CN | 102765402 A | 11/2012 |
| CN | 103101048 A | 4/2013 |
| JP | 50-012404 U | 2/1975 |
| JP | 50-133608 U | 11/1975 |
| JP | 53-022406 U | 2/1978 |
| JP | 55-56401 * | 4/1980 |
| JP | 55-094104 U | 6/1980 |
| JP | 2012-130142 A | 7/2012 |
| KR | 2001-0105807 A | 11/2001 |
| KR | 10-2012-0098041 A | 9/2012 |

OTHER PUBLICATIONS

Chinese First Examination Report of corresponding China patent application No. 201210554659.2, dated Sep. 19, 2014.
The extended European Search Report of corresponding European patent application No. 13866348.9 and corresponding international PCT application No. PCT/CN2013/089071, dated Feb. 25, 2016.

* cited by examiner

BOGIE FOR RAIL VEHICLE

CROSS-REFERENCE TO RELATED APPLICATIONS

This application is a continuation of International Application No. PCT/CN2013/089071, filed on Dec. 11, 2013, which claims the priority benefit of Chinese Patent Application No. 201210554659.2, filed on Dec. 18, 2012. The contents of the above identified applications are hereby incorporated by reference in their entireties.

FIELD OF THE TECHNOLOGY

The present invention relates to rail vehicle manufacturing technology, and more particularly to a bogie for a rail vehicle.

BACKGROUND

In addition to a bow net power receiving manner, a power-driven rail vehicle often picks up current from a third rail (also referred to as rigid powder-supply rail) by a current collector mounted on a traction unit or a trailer unit.

In the power receiving manner of picking up current from the third rail by the current collector, the bogie for the rail vehicle needs to mount a current collector; the current collector includes: a current collecting shoe mechanism and a fuse for protecting devices of the train, where the current collecting shoe mechanism includes a mounting base for fixedly mounting to the train bogie, a sliding block for contacting the third rail, and a sliding shoe for connecting the sliding block to a connecting shaft of the mounting base; when the train is in operation, the sliding block slides along the third rail, to transfer the current from the third rail to each powered device on the train. FIG. 1 is a schematic structural diagram of a bogie for a rail vehicle in the prior art; as shown in FIG. 1, the bogie includes: two pairs of wheel sets 51 arranged frontward and backward, axle boxes respectively fixedly arranged at both ends of a central rotating shaft of each wheel set 51, a frame 50 arranged across two front and back axle boxes on the same side, and an elastic suspension device is provided between the axle box and the frame 50; in the prior art, the current collector is fixedly mounted on the frame 50 at one side of the bogie, and due to buffering action of the elastic suspension device, the frame has relatively large displacements in all directions relative to the rail, causing the current collector mounted on the frame to have relatively large displacements in all directions relative to the third rail, and to suffer relatively large impact and vibration, and therefore, construction of steel rail requires higher quality and larger costs.

SUMMARY

In view of the above deficiencies in the prior art, the present invention provides a bogie for a rail vehicle, capable of reducing displacements of the current collector in all directions relative to the third rail, while ensuring a normal operation of the current collector.

The present invention provides a bogie for a rail vehicle, including: two pairs of wheel sets arranged frontward and backward, axle boxes respectively fixedly arranged at both ends of a central rotating shaft of the wheel set, and a frame arranged on two axle boxes on the same side, and further including: a current collector mounting plate that is fixedly mounted with a current collector, with both ends of the current collector mounting plate being respectively fixedly connected to the two axle boxes on the same side.

In the bogie for the rail vehicle according to the present invention, the current collector is fixedly connected on the axle box, and thus the current collector has the same state of motion as the axle box, during operation of the rail vehicle. The displacements of the axle box in all directions relative to the rail are much less than those of the frame enlarged by the elastic suspension device, thus greatly reducing the displacements of the current collector in all directions relative to the third rail during operation, decreasing vibration and impact suffered by the current collector, and thus lowering costs required for constructing steel rails.

DETAILED DESCRIPTION

Figure 1:
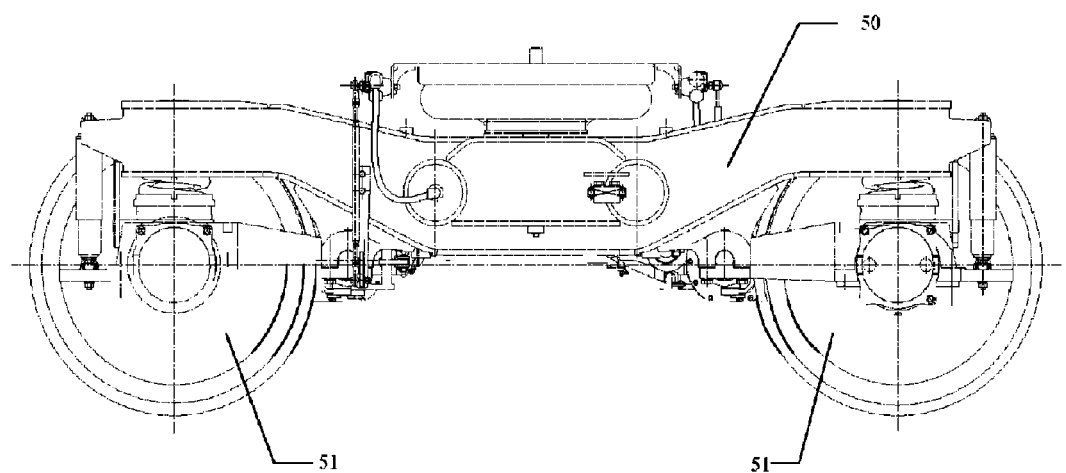
FIG. 1 is a schematic structural diagram of a bogie for a rail vehicle in the prior art.
Figure 2:
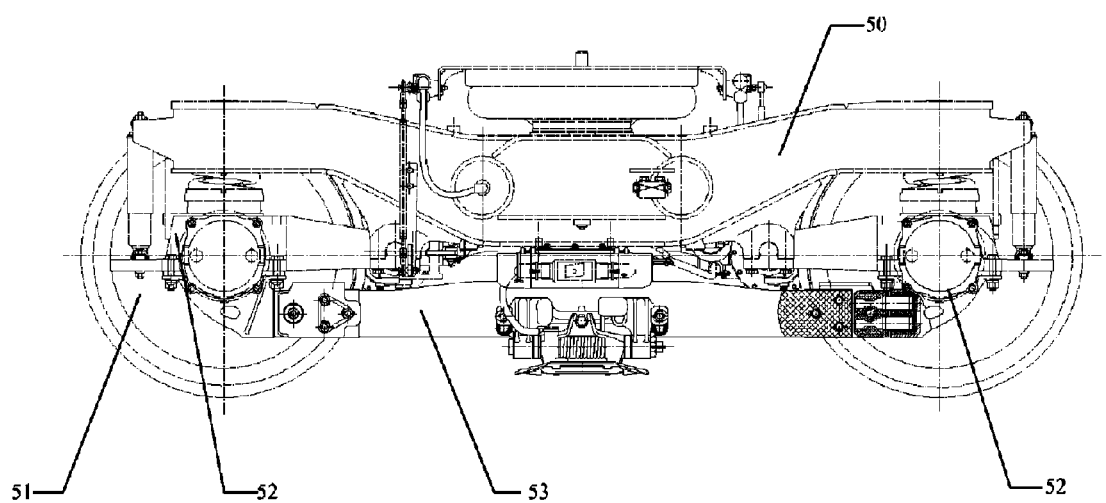
FIG. 2 is a schematic structural diagram of a bogie for a rail vehicle of the present invention.
Figure 3:
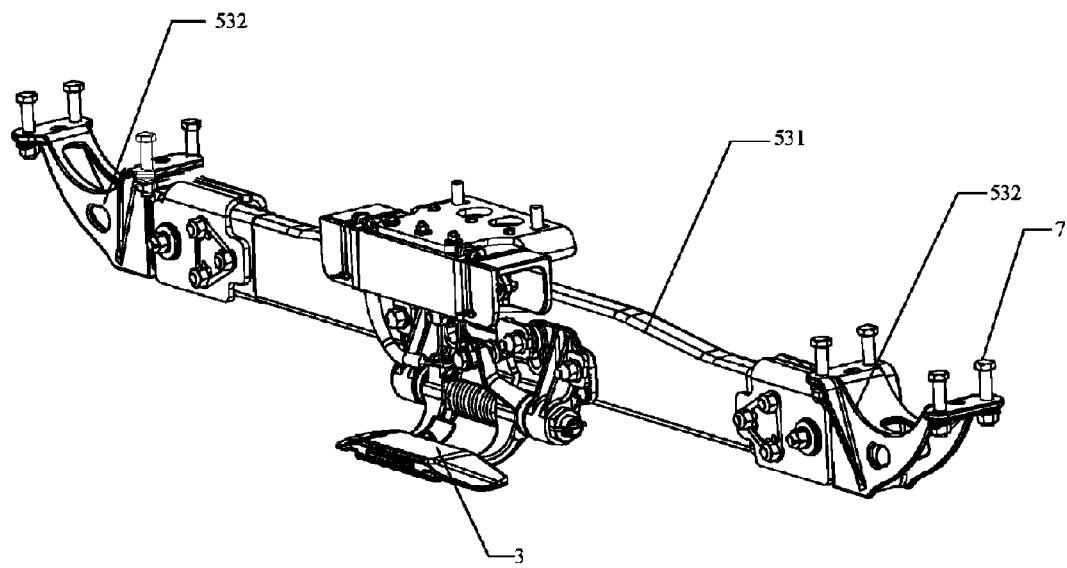
FIG. 3 is a perspective view of the current collector mounting plate and the current collector parts in the bogie shown in FIG. 2.
Figure 4:
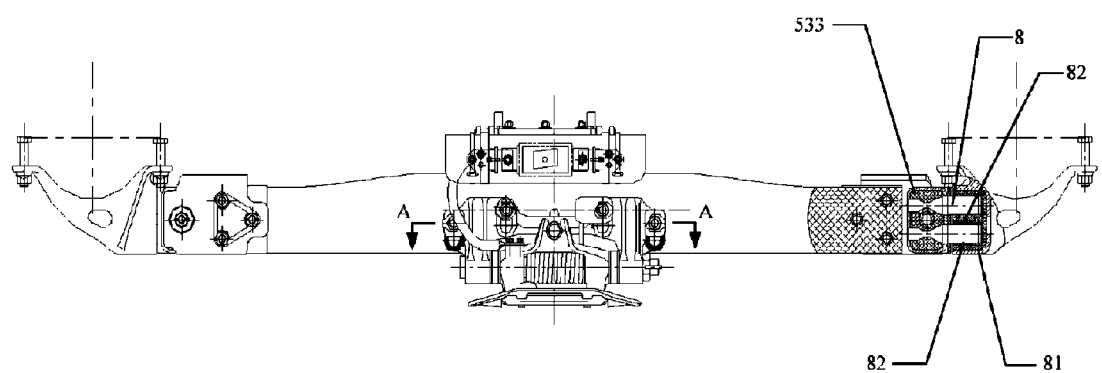
FIG. 4 is a top view of the parts shown in FIG. 3.
Figure 5:
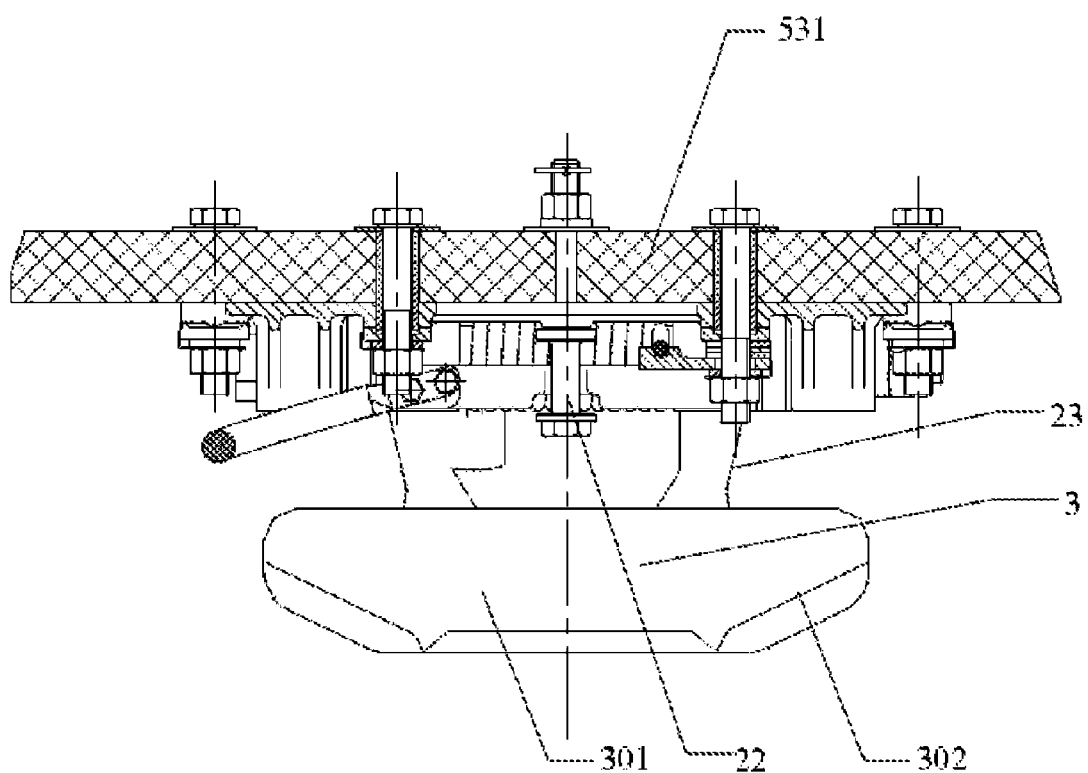
FIG. 5 is a sectional view taken along line A-A shown in FIG. 4.

FIG. 2 is a schematic structural diagram of a bogie for a rail vehicle of the present invention; FIG. 3 is a perspective view of the current collector mounting plate and the current collector parts in the bogie shown in FIG. 2; FIG. 4 is a top view of the parts shown in FIG. 3; and FIG. 5 is a sectional view taken along line A-A shown in FIG. 4. Refer to FIG. 2 to FIG. 5, this embodiment provides a bogie for a rail vehicle, including: two pairs of wheel sets 51 arranged frontward and backward, axle boxes 52 respectively fixedly arranged at both ends of a central rotating shaft of the wheel set 51, and a frame 50 arranged on two axle boxes 52 on the same side, and further including: a current collector mounting plate 53 that is fixedly mounted with a current collector, with both ends of the current collector mounting plate 53 being respectively fixedly connected to the two axle boxes 52 on the same side.

Specifically, the current collector may be mounted on an outwardly facing side of the current collector mounting plate 53, and the current collector mounting plate 53 may include: an elongated insulating plate 531, and connecting bases 532 fixedly arranged at both ends of the insulating plate 531, where the connecting base 532 is fixedly arranged with at least one fastener 7 for fixedly connecting to the axle box. The connecting base 532 may have a horizontal top surface, and the fastener 7 may be vertically and fixedly arranged on the top surface, so as to fixedly connect the connecting base 532 to a bottom surface of the corresponding axle box 52. Preferably, there may be four fasteners 7, respectively corresponding to four vertex angles at the bottom surface of the axle box 52.

In the bogie for the rail vehicle according to this embodiment, the current collector is fixedly connected on the axle box, and thus the current collector has the same state of motion as the axle box, during operation of the rail vehicle. The displacements of the axle box in all directions relative to the rail are much less than those of the frame enlarged by the elastic suspension device, thus greatly reducing the displacements of the current collector in all directions relative to the third rail 6 during operation, and decreasing vibration and impact suffered by the current collector.

In the above embodiment, two end surfaces of the insulating plate 531 are fixedly arranged with connecting elastic blocks 533 respectively, a connecting pin 8 is fixedly arranged within the connecting elastic block 533, and an end of the connecting pin 8 protrudes from the connecting elastic block 533; the connecting base 532 is provided with a pin hole 81 on a surface facing the connecting elastic block 533, and the connecting pin 8 passes through the corresponding pin hole 81 and conduct an axial movement in the pin hole 81, so as to adjust the entire length of the current collector mounting plate 53, and then the distance between two wheel sets of the bogie will be changed adaptively when the rail vehicle passes through a curve track, guaranteeing a good curve negotiation performance of the bogie.

Preferably, an elastic buffering layer 82 is provided between the pin hole 81 and the connecting pin 8, so as to better buffer impact of the third rail 6 on the current collector.

Figure 6:
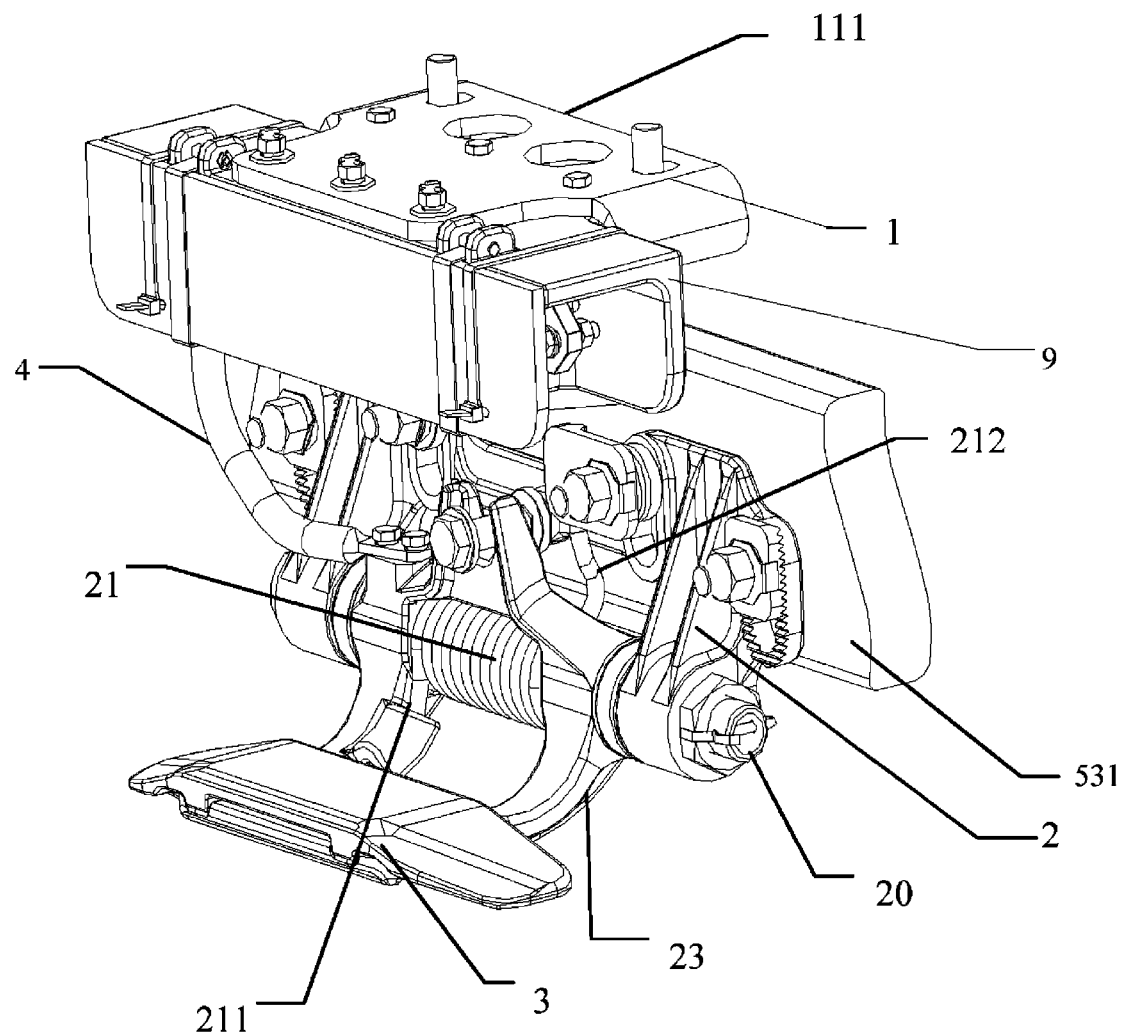
FIG. 6 is a perspective view of the current collector shown in FIG. 3.
Figure 7:
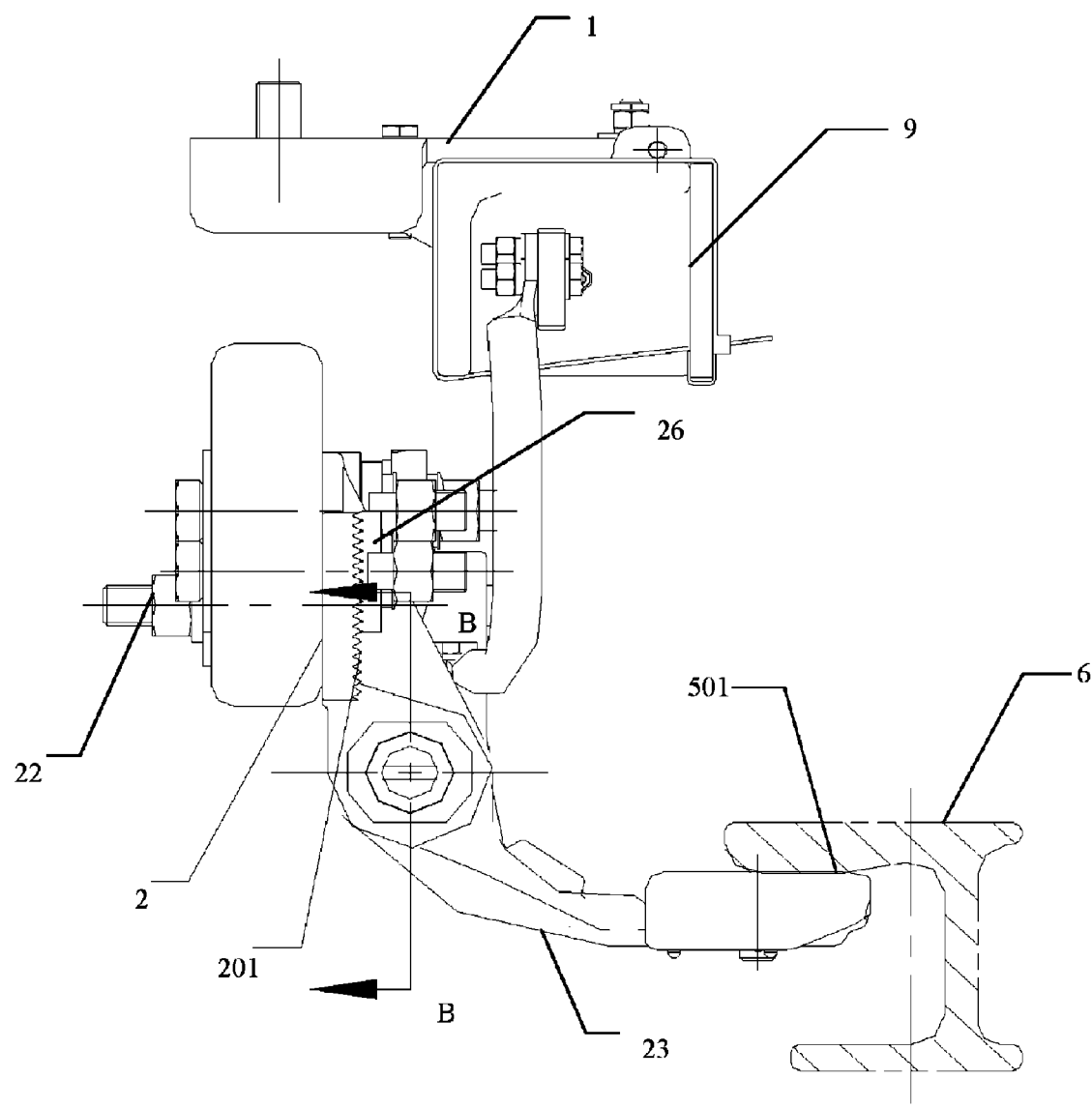
FIG. 7 is a side view of the current collector shown in FIG. 6.
Figure 8:
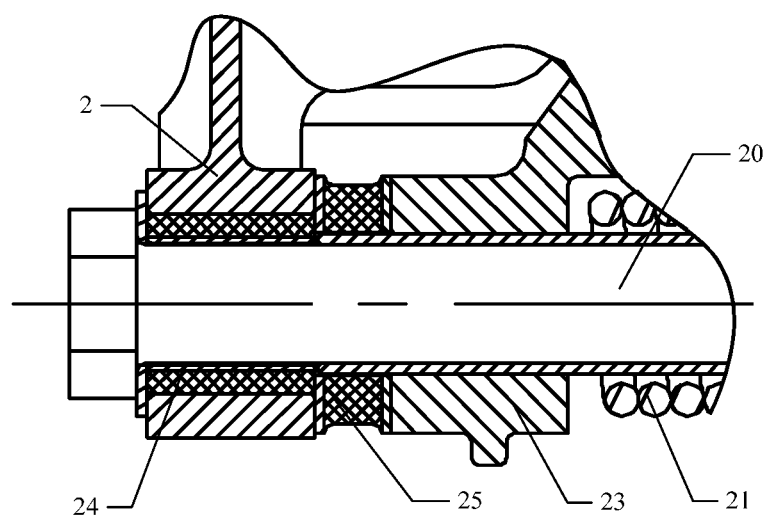
FIG. 8 is a sectional view taken along line B-B shown in FIG. 7.

FIG. 6 is a perspective view of the current collector shown in FIG. 3; FIG. 7 is a side view of the current collector shown in FIG. 6; FIG. 8 is a sectional view taken along line B-B shown in FIG. 7. Refer to FIG. 6 to FIG. 8, in this embodiment, the current collector includes: a fuse, a first mounting base 1 for mounting the fuse, a second mounting base 2 for mounting a sliding shoe 23 and a sliding block 3 for contacting a third rail 6; the second mounting base 2 is pierced to provide with a connecting shaft 20; one side of the sliding block 3 is fixedly arranged with at least two sliding shoes 23, the sliding shoe 23 at an end thereof is sleeved around the connecting shaft 20, and can rotate about the connecting shaft 20, the connecting shaft 20 is further provided with an elastic member 21 for forcing the top surface of the sliding block 3 against the third rail 6; a working wire 4 is connected between the sliding shoe 23 and the fuse.

In the above current collector, the first mounting base 1 may be formed by bending a steel plate, and top portion 111 of the first mounting base 1 is further fixedly arranged with a mounting box 9 for mounting the fuse, the mounting box 9 being made of an insulating material.

The second mounting base 2 is fixedly mounted on the current collector mounting plate 53, for example, the second mounting base 2 may be connected to an outwardly facing side of the insulating plate 531 of the current collector mounting plate 53 by a bolt, and the insulating plate 531 may be made of an insulating material, such as rubber, so as to guarantee the insulating property of the insulating plate 531. The second mounting base 2 may be of a flat plate-type structure, the connecting shaft 20 may pass through the two opposite side walls of the second mounting base 2, and may be correspondingly supported on the side walls in a relative fixed manner; the second mounting base 2 may be provided with an opening at the bottom, to reveal the middle of the connecting shaft 20; two cantilevered sliding shoes 23 may be fixedly arranged on the same side of the sliding block 3, the two cantilevered sliding shoes 23 may be in a curved shape, and an end of the sliding shoe 23 may form a cylindrical connecting portion, so as to relatively rotatably sleeve around the connecting shaft 20.

Preferably, the elastic member 21 may be a torsion spring sleeved around the connecting shaft 20, the torsion spring has a protruded first connecting end 211 and a protruded second connecting end 212, the first connecting end 211 is fixedly connected to the sliding shoe 23, the second connecting end 212 is fixed to the second mounting base 2, particularly, the second connecting end 212 may be clamped in the second mounting base 2, so as to allow the sliding shoe 23 to rotate about the connecting shaft 20 in a direction adjacent to the second mounting base 2 under the action of the torsion spring, and then, when the sliding block 3 extends into a groove resting against a side of the third rail 6, the top surface of the sliding block 3 will be pressed against a downward working surface 501 on the third rail 6 under the action of an elastic restoring force of the torsion spring.

The working wire 4 may connect an end of the sliding shoe 23 to one terminal of the fuse on the first mounting base 1, while another output terminal of the fuse may be connected to a vehicle body current receiving device via a wire.

Prior to the operation of the rail vehicle, the sliding shoe 23 may be pulled to rotate about the connecting shaft 20, so that the sliding block 3 may extend into a groove on a side of the third rail 6, and be pressed against the working surface 501; in this way, during operation of the rail vehicle, the sliding block 3 may move along the third rail 6, and always keep close contact with the third rail 6, so that the current flows from the third rail 6 to the sliding block 3, and then is transmitted to the vehicle body current receiving device via the sliding shoe 23, the working wire 4 and the fuse, thereby supplying power to the vehicle.

The current collector in the bogie for the rail vehicle according to this embodiment may reliably provide a power supply to the rail vehicle, the sliding block connected with the mounting base by at least two cantilevered sliding shoes has a high connecting strength, and does not cause a fracture after being subjected to an impact when passing a railhead or an endpoint of the third rail 6, greatly improving operational reliability and also reducing a maintenance cost of the current collector.

Further, the sliding block 3 may be an elongated plate, extending in the same direction as the third rail 6; the top surface of the elongated flat plate consists of a flat surface 301 in the middle and transitional inclined surfaces 302 on both sides for smoothly guiding the sliding block 3 into the third rail 6; that is, the top surface of the sliding block 3 may be a curved surface with a higher middle part and two gradually decreased sides. An acute value is formed between the transitional inclined surface 302 and the flat surface 301 in the middle of the elongated flat plate and may be in a range of 0~30°, so as to guarantee a sufficient extended length of the transitional inclined surface 302, and avoid impact on the current collector caused by the fact that height fluctuation of the third rail 6 makes the sliding block 3 difficult to enter the third rail 6.

Figure 9:
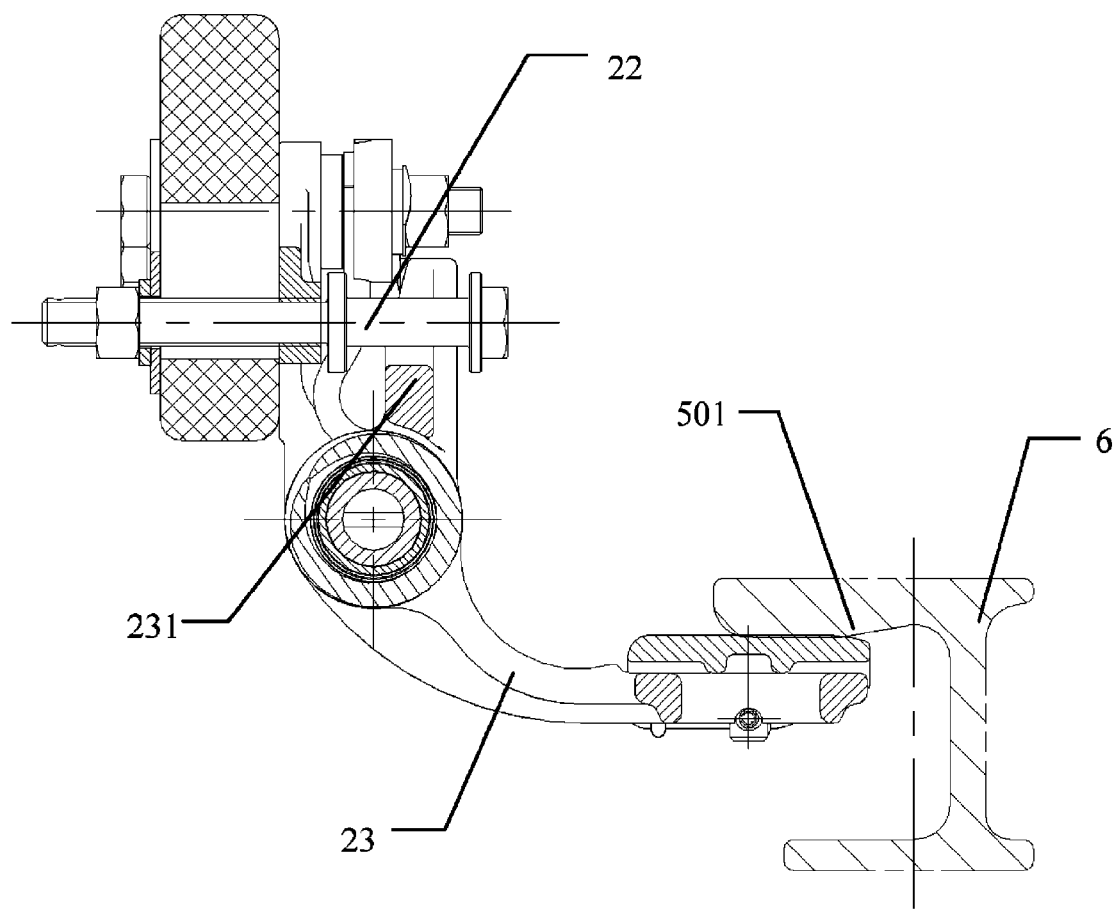
FIG. 9 is a cross-sectional view of the current collector shown in FIG. 7.

In the above embodiment, refer to FIG. 6 and FIG. 9, an end of the sliding shoe 23 is fixedly arranged with a stopper 231, the second mounting base 2 is screwed with an adjusting bolt 22, and an end of the adjusting bolt 22 presses against the stopper 231 and pushes the stopper 231 to drive the sliding shoe 23 to rotate about the connecting shaft 20, and thus adjusts the angle opened by the sliding shoe 23 relative to the second mounting base 2, so as to meet the requirements for different circuits. Preferably, bolt mounting sites of the second mounting base 2 are oblong holes, and front surface of the second mounting base 2 is provided with height adjusting teeth 201 that is matched with the teeth on a height adjusting toothed plate 26 to adjust working height of the two cantilevered sliding shoes 23 and compensate abrasion loss due to operation of the wheel.

Further, as shown in FIG. 6 to FIG. 8, the second mounting base 2 may be provided with at least two mounting through-holes, which may respectively be located on the two opposite side walls of the second mounting base 2, two ends of the connecting shaft 20 respectively pass through the two mounting through-holes; a first elastic sleeve 24 is fixedly sleeved around the connecting shaft 20, between the connecting shaft 20 and the corresponding mounting through-hole. Preferably, the first elastic sleeve 24 may include a metallic inner coil fixedly sleeved around the connecting shaft 20 and a rubber outer coil sleeved outside the metallic inner coil, such arrangement of the first elastic sleeve 24 may buffer impact forces of the sliding block 3 on the sliding shoe 23 in lateral and vertical directions, improving bearing capability of the whole current collector, and prolonging service life thereof.

Much further, a second elastic sleeve 25 for buffering axial impact is sleeved around the connecting shaft 20, between the first elastic sleeve 24 and adjacent sliding shoe 23. The second elastic sleeve 25 may be a rubber sleeve, so as to buffer a longitudinal impact suffered by the sliding shoe 23 when moving along the third rail 6.

Herein, the longitudinal direction refers to an extending direction of the third rail 6, that is, a running direction of the rail vehicle, and the lateral direction refers to a direction perpendicular to the longitudinal direction in a horizontal plane.

In the above embodiment, a necked-down section with a cross-sectional area smaller than that of other position is formed at the place where the sliding shoe 23 is adjacent to the sliding block 3, in the case of an accident that the sliding shoe 23 suffers from a very large impact, the necked-down section creates fracture first, so as to eliminate the impact effect and protect other portion of the current collector. It is only necessary to replace the sliding shoe during maintenance, significantly reducing maintenance costs when compared with the overall replacement of the current collector in the prior art.

Finally, it should be appreciated that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A bogie for a rail vehicle comprising: two pairs of wheel sets arranged frontward and backward, axle boxes respectively fixedly arranged at both ends of a central rotating shaft of the wheel set, and a frame arranged on two axle boxes on the same side, wherein the bogie further comprises: a current collector mounting plate that is fixedly mounted with a current collector, with both ends of the current collector mounting plate being respectively fixedly connected to the two axle boxes on the same side, the current collector mounting plate comprises: an elongated insulating plate, and connecting bases fixedly arranged at both ends of the insulating plate, wherein each of the connecting bases is fixedly arranged with at least one fastener for fixedly connecting to the axle box, and two end surfaces of the insulating plate are fixedly arranged with connecting elastic blocks respectively, a connecting pin is fixedly arranged within each of the connecting elastic blocks, and a tail end of the connecting pin protrudes from the connecting elastic block; the connecting base is provided with a pin hole on a surface facing the connecting elastic block, and the connecting pin passes through the corresponding pin hole.

2. The bogie for the rail vehicle according to claim 1, wherein, an elastic buffering layer is provided between the pin hole and the connecting pin.

3. The bogie for the rail vehicle according to claim 1, wherein, the current collector comprises: a fuse, a first mounting base for mounting the fuse, a second mounting base for mounting a sliding shoe and a sliding block for contacting a third rail; the second mounting base is pierced to provide with a connecting shaft; one side of the sliding block is fixedly arranged with at least two sliding shoes, each of the sliding shoes at an end thereof is sleeved around the connecting shaft, and can rotate about the connecting shaft, the connecting shaft is further provided with a torsion spring for forcing the top surface of the sliding block against the third rail; a working wire is connected between the sliding shoe and the fuse.

4. The bogie for the rail vehicle according to claim 3, wherein, the sliding block is an elongated flat plate, extending in the same direction as the third rail; the top surface of the elongated flat plate consists of a flat surface in the middle and inclined surfaces on both sides for smoothly guiding the sliding block into the third rail.

5. The bogie for the rail vehicle according to claim 4, wherein, the second mounting base is fixedly connected on the current collector mounting plate.

6. The bogie for the rail vehicle according to claim 5, wherein, the first mounting base is formed by bending a steel plate, and a top portion of the first mounting base is further fixedly arranged with a mounting box for mounting the fuse, the mounting box being made of an insulating material.

7. The bogie for the rail vehicle according to claim 6, wherein, an end of the sliding shoe is fixedly arranged with a stopper, the second mounting base is mounted with an adjusting bolt, and an end of the adjusting bolt presses against the stopper.

8. The bogie for the rail vehicle according to claim 7, wherein, a necked-down section with a cross-sectional area smaller than that of other position is formed at a place where the sliding shoe is adjacent to the sliding block.

9. The bogie for the rail vehicle according to claim 7, wherein, the second mounting base is provided with at least two mounting through-holes, the connecting shaft passes through the mounting through-hole; a first elastic sleeve is fixedly sleeved around the connecting shaft, between the connecting shaft and corresponding mounting through-hole.

10. The bogie for the rail vehicle according to claim 9, wherein, a second elastic sleeve for buffering axial impact is sleeved around the connecting shaft, between the first elastic sleeve and adjacent sliding shoe.

* * * * *